(12) United States Patent
Steen et al.

(10) Patent No.: US 7,278,950 B2
(45) Date of Patent: Oct. 9, 2007

(54) STAGE-GEARED GEARBOX FOR MOTOR VEHICLES

(75) Inventors: Marcus Steen, Angered (SE); Lars Karlsson, Göteborg (SE)

(73) Assignee: Volvo Lastvagnar AB, Gothenburg (CH)

( * ) Notice: Subject to any disclaimer, the term of this patent is extended or adjusted under 35 U.S.C. 154(b) by 75 days.

(21) Appl. No.: 10/526,777

(22) PCT Filed: Sep. 5, 2003

(86) PCT No.: PCT/SE03/01389

§ 371 (c)(1),
(2), (4) Date: Jul. 29, 2005

(87) PCT Pub. No.: WO2004/023003

PCT Pub. Date: Mar. 18, 2004

(65) Prior Publication Data

US 2006/0162490 A1    Jul. 27, 2006

(30) Foreign Application Priority Data

Sep. 9, 2002    (SE) .................................... 0202704

(51) Int. Cl.
*F16H 3/44*    (2006.01)

(52) U.S. Cl. ...................... 475/303; 475/209; 475/302; 74/745; 74/329; 74/331; 74/333; 74/335

(58) Field of Classification Search ................ 475/207, 475/209, 302, 303, 317; 74/745, 325, 329, 74/331, 333, 335
See application file for complete search history.

(56) References Cited

U.S. PATENT DOCUMENTS

| | | | | |
|---|---|---|---|---|
| 3,429,202 | A * | 2/1969 | Galicher ..................... | 475/209 |
| 4,986,142 | A * | 1/1991 | Borodin et al. .......... | 74/473.19 |
| 5,791,189 | A * | 8/1998 | Newbigging ................. | 74/335 |
| 6,250,172 | B1 * | 6/2001 | Pigozzi et al. ............ | 74/336 R |
| 6,440,032 | B1 * | 8/2002 | Stauber et al. .............. | 475/207 |
| 6,709,356 | B2 * | 3/2004 | Fuhrer et al. ............... | 475/207 |
| 2001/0025536 | A1 * | 10/2001 | Nishimura ................... | 74/335 |

FOREIGN PATENT DOCUMENTS

| | | |
|---|---|---|
| EP | 0612642 A1 | 8/1994 |
| WO | WO 0192048 A1 | 12/2001 |
| WO | WO 0192049 A1 | 12/2001 |

OTHER PUBLICATIONS

International Search Report from PCT/se2003/001389.

* cited by examiner

*Primary Examiner*—David D. Le
(74) *Attorney, Agent, or Firm*—WRB-IP LLP

(57) ABSTRACT

A stage-geared gearbox for motor vehicles, includes an unsynchronized basic gearbox, at least one synchronized auxiliary gear and at least one control unit for controlling engagement and disengagement of the gears of the gearbox and also neutral position. In the gearbox, the control unit is arranged so as, when input signals indicating that neutral position is selected are received, to put the synchronized auxiliary gear in neutral position.

7 Claims, 2 Drawing Sheets

STAGE-GEARED GEARBOX FOR MOTOR VEHICLES

TECHNICAL FIELD OF THE INVENTION

The present invention relates to a device for motor vehicles according, which device concerns a stage-geared gearbox for transmitting driving power from the engine to the driving axles and driving wheels of the vehicle.

STATE OF THE ART

Automatic gearboxes of the automated stage-geared gearbox type have become increasingly common in heavy-duty vehicles as microcomputer technology has developed further and made it possible, with a control computer and a number of actuators, for example servo motors, to precision-regulate engine speed, engagement and disengagement of an automated disk clutch between the engine and the gearbox and also the coupling means of the gearbox in relation to one another, so that soft shifting is always obtained at the correct engine speed. In heavy-duty vehicles, these automatic gearboxes are often equipped with a basic gearbox, which has unsynchronized forward and reverse gears, and also synchronized auxiliary gears, which auxiliary gears can be arranged in series before and/or after the basic gearbox. An example of an auxiliary gear arranged serially before the basic gearbox is a split gear and of an auxiliary gear arranged serially after the basic gearbox is a range gear (see, for example, SE516751). On shifting between the unsynchronized gears of the basic gearbox, such a selected gear is synchronized by the speed of the engine of the vehicle being precision-controlled to the correct speed before engagement of the selected gear takes place. The disk clutch is consequently engaged when such precision-control takes place.

The advantage of this type of automatic gearbox compared with a conventional automatic gearbox constructed with planetary gear stages and with a hydrodynamic torque converter on the input side is on the one hand that, especially as far as use in heavy-duty vehicles is concerned, it is simpler and more robust and can be manufactured at a considerably lower cost than the conventional automatic gearbox and on the other hand that it has higher efficiency, which means lower fuel consumption is possible.

According to the known art for the abovementioned type of automated stage-geared gearbox, the following happens when neutral position is selected. When the transmission control system receives an input signal indicating that neutral position is selected, the unsynchronized basic gearbox is placed in its neutral position. This means that all the gears of the basic gearbox are disengaged and consequently it is not possible to transmit torque through the basic gearbox.

A disadvantage of this is that if it occurs while the vehicle is being driven, the gearbox can be rendered useless if the engine of the vehicle should stop. If the engine cannot be controlled, a new gear in the basic gearbox cannot be selected, because the synchronization of a gear takes place by means of precision-control of the speed of rotation of the engine. Consequently, a new gear in the basic gearbox cannot be engaged. The control system does not allow shifting because the gearbox may be damaged. As the steering servo pump, for example, is usually driven by the engine, units which are driven by the steering servo pump stop functioning, which means that the vehicle becomes sluggish to steer. Moreover, any engine brakes present cannot be engaged either for braking the vehicle.

There is consequently a need in a vehicle equipped with an automated stage-geared gearbox, where the basic gearbox is unsynchronized and at least one auxiliary gear is synchronized, to ensure that the gearbox is not rendered useless when the vehicle is being driven, the gearbox is in neutral position and the engine stops.

SUMMARY OF THE INVENTION

The device according to the invention describes a stage-geared gearbox for motor vehicles, comprising an unsynchronized basic gearbox, at least one synchronized auxiliary gear and at least one control unit for controlling engagement and disengagement of the gears of the gearbox and also neutral position. The gearbox is characterized in that the control unit is arranged so as, when input signals indicating that neutral position is selected are received, to put the synchronized auxiliary gear in neutral position.

The advantage of the device according to the invention is that it is possible to engage a gear when the vehicle is being driven, the gearbox is in neutral position and the engine stops. As the auxiliary gear is synchronized, no external arrangements for synchronizing the speed of rotation are required. The gearbox is consequently not rendered useless on account of the engine having stopped.

In a first embodiment of the device according to the invention, the control unit is arranged so as in the unsynchronized basic gearbox to keep the previous selected gear engaged at the same time as a synchronized auxiliary gear is placed in its neutral position.

The advantage of the device according to the invention is that in this way, together with the fact that the auxiliary gear is engaged either in low gear position (LS) or high gear position (HS), a total gearing through the entire gearbox is obtained.

BRIEF DESCRIPTION OF THE DRAWINGS

The present invention will be described in greater detail below with reference to the accompanying drawings, which, for the purpose of exemplification, show further preferred embodiments of the invention and also the technical background.

In FIG. 1, reference number 1 designates a six-cylinder internal combustion engine, for example a diesel engine, the crankshaft 2 of which is coupled to a single-plate dry disk clutch, designated generally by reference number 3, which is enclosed in a clutch case 4. The crankshaft 2 is, via the output shaft 51 of the engine, connected non-rotatably to the clutch housing 5 of the clutch 3, while its plate 6 is connected non-rotatably to an input shaft 7 which is mounted rotatably in the casing 8 of a gearbox designated generally by reference number 9. A main shaft 10 and an intermediate shaft 11 are also mounted rotatably in the casing 8.

Figure 2:
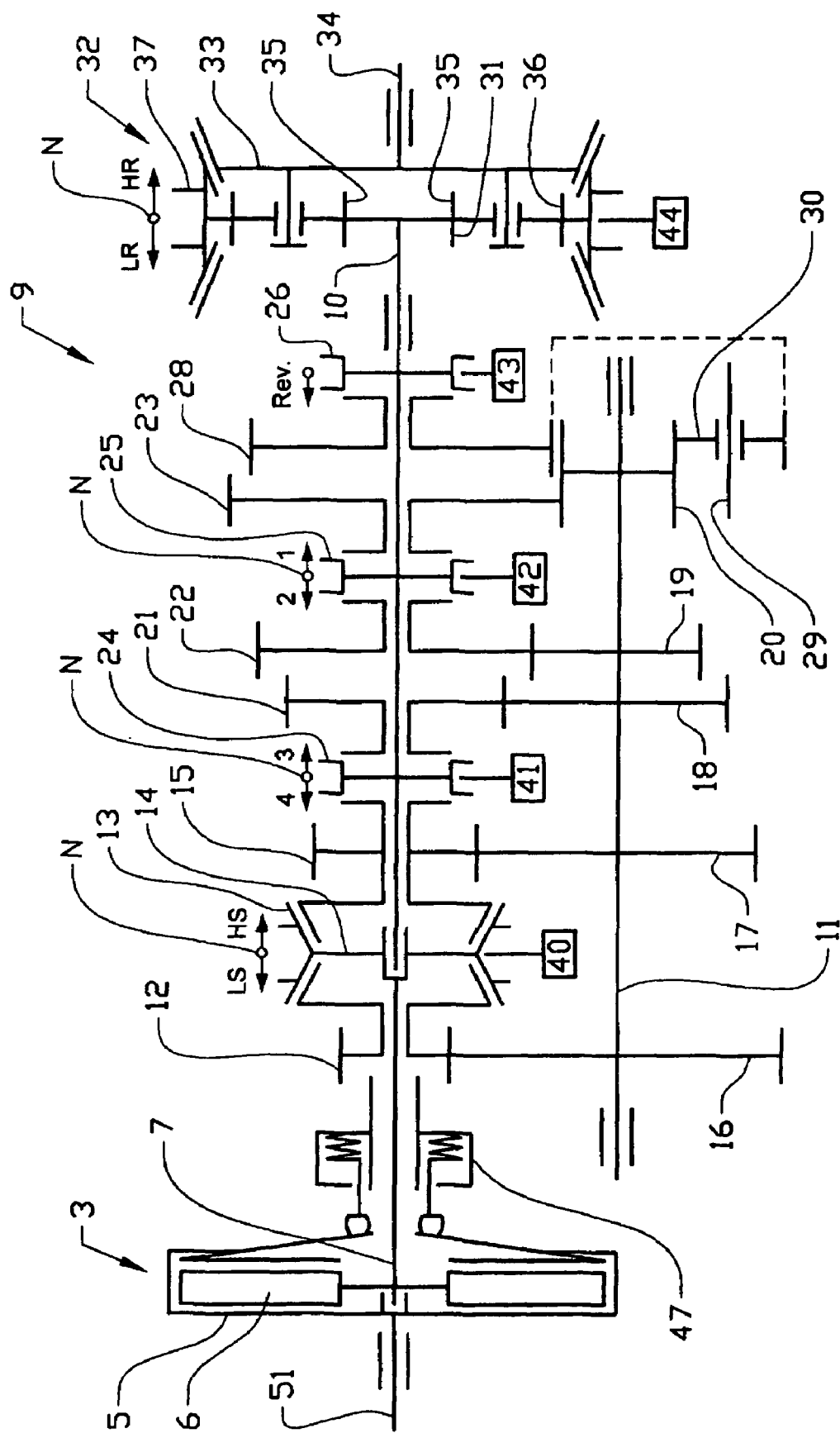
FIG. 2 shows the clutch and the gearbox in FIG. 1 on enlarged scale.

As can be seen most clearly from FIG. 2, a gearwheel 12 is mounted rotatably on the input shaft 7 and is lockable on the shaft by means of a coupling sleeve 13 which is provided with synchronizing means and is mounted non-rotatably but axially displaceably on a hub 14 connected non-rotatably to the input shaft 7. By means of the coupling sleeve 13, a gearwheel 15 mounted rotatably on the main shaft 10 is also lockable relative to the input shaft 7. With the coupling sleeve 13 in a central position, both the gearwheels 12 and 15 are disengaged from their shafts 7 and, respectively, 10. The gearwheels 12 and 15 engage with gearwheels 16 and, respectively, 17 which are connected non-rotatably to the intermediate shaft 11. Arranged in a rotationally fixed manner on the intermediate shaft 11 are further gearwheels 18, 19 and 20 which engage with gearwheels 21, 22 and, respectively, 23 which are mounted rotatably on the main shaft 10 and are lockable on the main shaft by means of coupling sleeves 24 and, respectively, 25 which, in the illustrative embodiment shown, do not have synchronizing devices. A further gearwheel 28 is mounted rotatably on the main shaft 10 and engages with an intermediate gearwheel 30 which is mounted rotatably on a separate shaft 29 and in turn engages with the intermediate shaft gearwheel 20. The gearwheel 28 is lockable on its shaft by means of a coupling sleeve 26.

The gearwheel pairs 12, 16 and 15, 17 and the coupling sleeve 13 form a synchronized split gear with a low gear stage LS and a high gear stage HS. The gearwheel pair 15, 17 also forms, together with the gearwheel pairs 21, 18, 22, 19, 23, 20 and 28, 30, a basic gearbox with four forward gears and one reverse gear. Arranged in a rotationally fixed manner on the output end of the main shaft is a gearwheel 31 which forms the sun gear in a two-stage synchronized range gear of planetary type which is designated by reference number 32 and the planet-wheel carrier 33 of which is connected in a rotationally fixed manner to a shaft 34 which forms the output shaft of the gearbox. The planet wheels 35 of the range gear 32 engage with a ring gear 36 which, by means of a coupling sleeve 37, is lockable relative to the gearbox casing 8 for low range LR and relative to the planet-wheel carrier 33 for high range HR.

The coupling sleeves 13, 24, 25, 26 and 37 are displaceable as shown by the arrows in FIG. 2, the gear stages shown in conjunction with the arrows being obtained. The coupling sleeves 13, 24, 25 each have three positions; two gear positions and a neutral position N (central position). The coupling sleeve 26 has one gear position and a neutral position N. The coupling sleeve 37 has two gear positions LR and HR. The displacement of the coupling sleeves is brought about by respective servo devices 40, 41, 42, 43 and 44 indicated diagrammatically in FIG. 2, which can be pneumatically operated piston/cylinder arrangements of the type used in a gearbox of the type described above which is marketed under the name I-shift.

Figure 1:
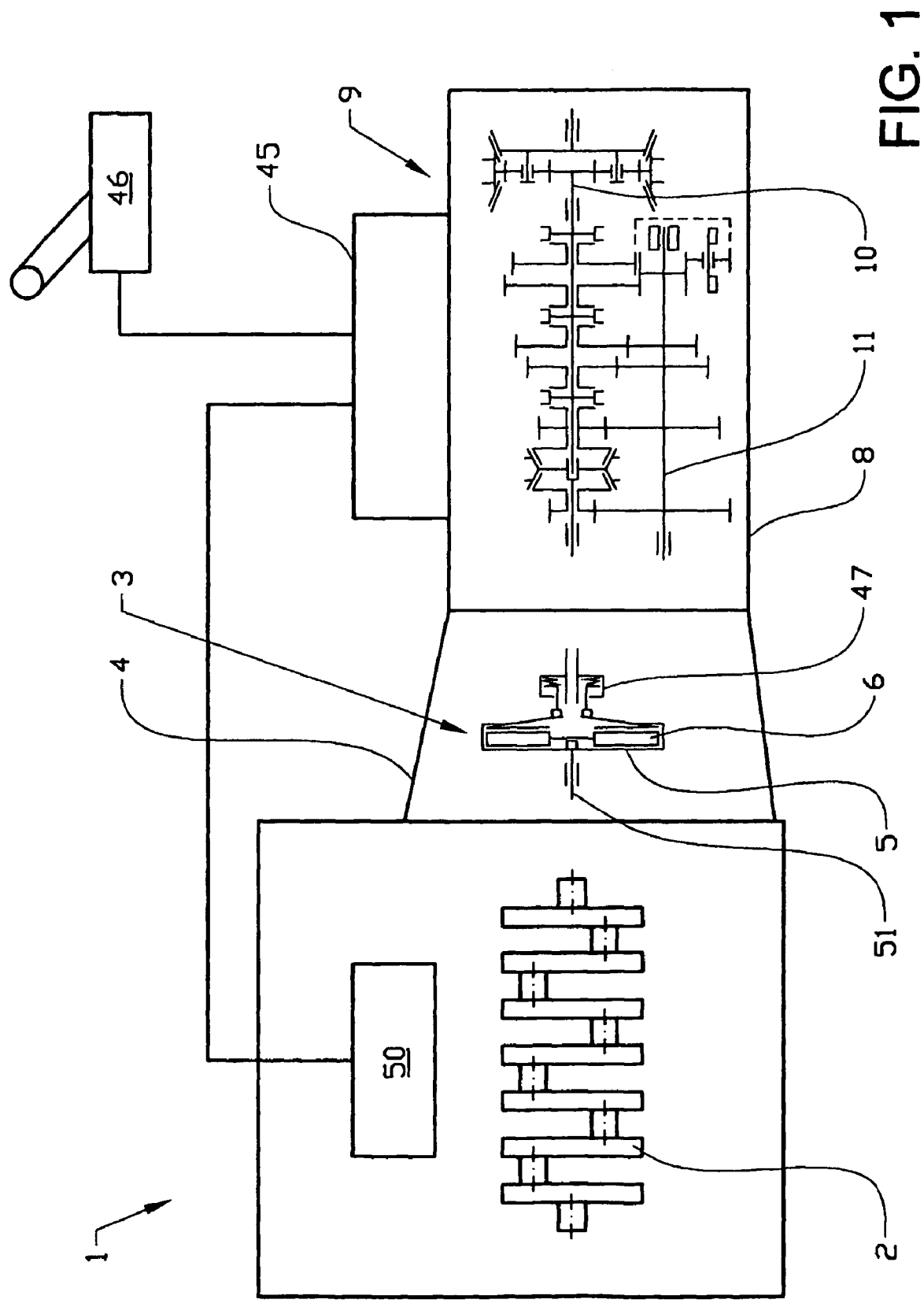
FIG. 1 shows a diagrammatic representation of an internal combustion engine with adjacent clutch and gearbox.

The servo devices 40, 41, 42, 43 and 44 are controlled by an electronic control unit 45 (see FIG. 1), comprising a microcomputer, depending on signals fed into the control unit representing various engine and vehicle data comprising at least engine speed, vehicle speed, throttle pedal position and, where appropriate, engine brake on/off, when an electronic gear selector 46 coupled to the control unit 45 is in its automatic shifting position. When the selector is in the position for manual shifting, shifting takes place at the command of the driver via the gear selector 46.

The control unit 45 also controls the fuel injection via the engine control unit 50.

When shifting of the unsynchronized gears in the basic gearbox takes place, the speed is synchronized by precision-control of the speed of rotation of the engine 1. Consequently, the disk clutch 3 is engaged, so that the speed of rotation of the input shaft 7 and the intermediate shaft 11 is adapted to a new selected gearing. The engine speed is regulated depending on injected fuel quantity and engine brake.

When shifting of the synchronized gears, that is to say the split gear or range gear, takes place, the speed adaptation is effected by synchronizing rings (not shown in figure). When such shifting takes place, the disk clutch 3 is disengaged. The control unit 45 controls the fuel injection, that is to say the engine speed, depending on the throttle pedal position and also the air supply to a pneumatic piston/cylinder arrangement 47, by means of which the disk clutch 3 is disengaged or engaged before and after engagement of a new selected gear is completed.

According to the invention, the control unit 45 is programmed so that, when the control unit 45 receives an input signal indicating that neutral position is desired, the split gear 12, 13, 15, 16, 17 is put in its neutral position N. The input signal for neutral position can be obtained either by, when shifting is effected manually, the driver selecting neutral position via the gear selector 46 or by, when the gear selector 46 is located in its automatic position, the control system 45 opting to shift to neutral position on the basis of certain given input signals, for example when the vehicle is in a state for freewheeling (see, for example, SE516751) and the vehicle is equipped with this function.

If for any reason the engine 1 stops during driving and the gearbox 9 is at the same time in the neutral position, the control unit 45 is, according to the invention, programmed to engage either the low gear stage LS or the high gear stage HS of the split gear depending on the speed of the vehicle. As the neutral position is obtained via a synchronized gear, synchronization can take place irrespective of whether the engine has stopped or not. The total gearing is obtained together with the previous engaged gear in the basic gearbox, which consequently remains engaged while the neutral position is occupied as well.

During normal driving, that is to say the engine does not stop while the neutral position is occupied, the control unit 45 opts to engage a selected gear, that is to say all the gears of the gearbox are available for shifting.

According to a special embodiment, when the vehicle is standing still, the unsynchronized basic gearbox can be placed in its neutral position when neutral shifting is requested by means of, for example, the gear selector 46, as in such a stationary state the engine does not need to be used for synchronizing the input shaft 7 and intermediate shaft 11 of the gearbox for a selected gearing. (This is normally effected by means of what is known as an intermediate shaft brake which is not shown in the figures.)

The functioning according to the invention can be obtained in a corresponding way with a range gear equipped with a neutral position.

The invention claimed is:

1. A stage-geared gearbox for motor vehicles, comprising:
 an unsynchronized basic gearbox, the unsynchronized basic gearbox comprising at least one unsynchronized gear;
 at least one synchronized auxiliary gear; and
 at least one control unit for controlling engagement of the unsynchronized and synchronized auxiliary gears and neutral positions of the unsynchronized and synchronized gears, wherein, when the control unit receives a driver shift input to put all unsynchronized gears of the basic gearbox in a basic gearbox neutral position, the control unit puts the at least one synchronized auxiliary gear in an auxiliary gear neutral position such that gear reengagement through a reengagement of the at least one synchronized auxiliary gear can be secured if an engine of the motor vehicle stops while the unsynchronized gears are in the basic gearbox neutral position and the vehicle is driven at a speed other than zero.

2. The stage-geared gearbox as claimed in claim 1, wherein the at least one synchronized auxiliary gear comprises a split gear.

3. The stage-geared gearbox as claimed in claim 1, wherein the at least one synchronized auxiliary gear comprises a range gear.

4. The stage-geared gearbox as claimed in claim 1, wherein the control unit is arranged to engage a stage of the at least one synchronized auxiliary gear when all unsynchronized gears of the basic gearbox are in the basic gearbox neutral position and the engine with which the stage-geared gearbox is associated stops.

5. The stage-geared gearbox as claimed in claim 1, wherein, when the synchronized auxiliary gear is in the auxiliary gear neutral position, the control unit keeps a previously selected gear of the basic gearbox engaged.

6. The stage-geared gearbox as claimed in claim 5, wherein the at least one synchronized auxiliary gear comprises a split gear.

7. The stage-geared gearbox as claimed in claim 5, wherein the at least one synchronized auxiliary gear comprises a range gear.

* * * * *